United States Patent

[11] 3,584,297

| [72] | Inventor | Oscar H. Koski<br>Richland, Wash. |
|---|---|---|
| [21] | Appl. No. | 820,194 |
| [22] | Filed | Apr. 29, 1969 |
| [45] | Patented | June 8, 1971 |
| [73] | Assignee | The United States of Americal as represented by the United States Atomic Energy Commission |

[54] IMPEDANCE MEASURING DEVICE INCLUDING CHARGING-DISCHARGING MEANS
1 Claim, 2 Drawing Figs.

[52] U.S. Cl. ............................................. 324/57R, 307/279, 324/60R
[51] Int. Cl. ............................................. G01r 27/00
[50] Field of Search .......................................... 324/57, 60, 62, 78; 307/271, 294, 273, 279, 293; 331/111, 65, 112

[56] References Cited
UNITED STATES PATENTS

| 2,629,054 | 2/1953 | Craig | 331/65 |
|---|---|---|---|
| 2,988,709 | 6/1961 | Janssen | 331/65X |
| 3,266,167 | 8/1966 | Finnegan | 324/65 |
| 3,427,562 | 2/1969 | Lajoie et al. | 331/111 |

Primary Examiner—Edward E. Kubasiewicz
Attorney—Roland A. Anderson

ABSTRACT: A device for measuring the value of an unknown of one of a capacitive impedance and a resistive impedance connected in parallel includes a pulse generator circuit for producing an output in response to a first predetermined voltage across the parallel impedance combination, a circuit for charging the capacitive impedance to a second predetermined voltage greater in value than the first voltage in response to the output of the pulse generator circuit, and a recording circuit for measuring the output o the pulse generator circuit.

Inventor
Oscar H. Koski
Attorney 3,584,297

1

IMPEDANCE MEASURING DEVICE INCLUDING CHARGING-DISCHARGING MEANS

CONTRACTUAL ORIGIN OF THE INVENTION

The invention described herein was made in the course of, or under, a contract with the United States Atomic Energy Commission.

BACKGROUND OF THE INVENTION

The present invention relates to devices for remote measurements of physical variables and in particular to an electrical device for measuring the magnitude of a remotely positioned electrical impedance.

Electrical impedance is frequently used as an inferential measure of position, pressure, liquid level, temperature, illumination, or other physical parameters. For example, changes in the liquid level in a tank may be measured using a capacitance probe embodying concentrically mounted cylinders positioned in the liquid such that a change in the level of the liquid in the tank causes an equal level change in the liquid between the concentric cylinders and hence a change in the capacitive impedance of the probe. In nuclear applications such impedances are often in a high radiation zone requiring the use of long cables to connect an impedance to a remotely placed measuring device. The impedance of the interconnecting cables reduces the sensitivity of the measuring device in detecting incremental changes in the impedance to be measured that are often orders of magnitude smaller than the impedance of the interconnecting cables.

It is therefore an object of this invention to provide improved means for converting the magnitude of am impedance into a pulse rate representative thereof.

It is another object of this invention to provide improved means for measuring the magnitude of a remotely positioned impedance.

It is still another object of this invention to provide means for measuring in a radioactive zone the magnitude of an impedance.

SUMMARY OF THE INVENTION

In accordance with the invention, a capacitive impedance and a resistive impedance, one of which has an unknown magnitude, are connected in parallel to the output of a first circuit which in response to a pulse applied to the input thereof rapidly charges the capacitive impedance to a first predetermined voltage and to the input of a second circuit which produces an output pulse when the capacitive impedance has been discharged through the resistive impedance to a second predetermined voltage. The output pulse of the second circuit is coupled to pulse recording means and to the input of the first circuit.

BRIEF DESCRIPTION OF THE DRAWINGS

A more complete understanding of the invention will best be obtained from consideration of the accompanying drawings in which.

PREFERRED EMBODIMENTS OF THE INVENTION

The invention will first be described for the case in which the capacitive impedance is unknown. As will be shown later, the invention operates equally well for the case in which the resistive impedance is unknown.

Figure 1:
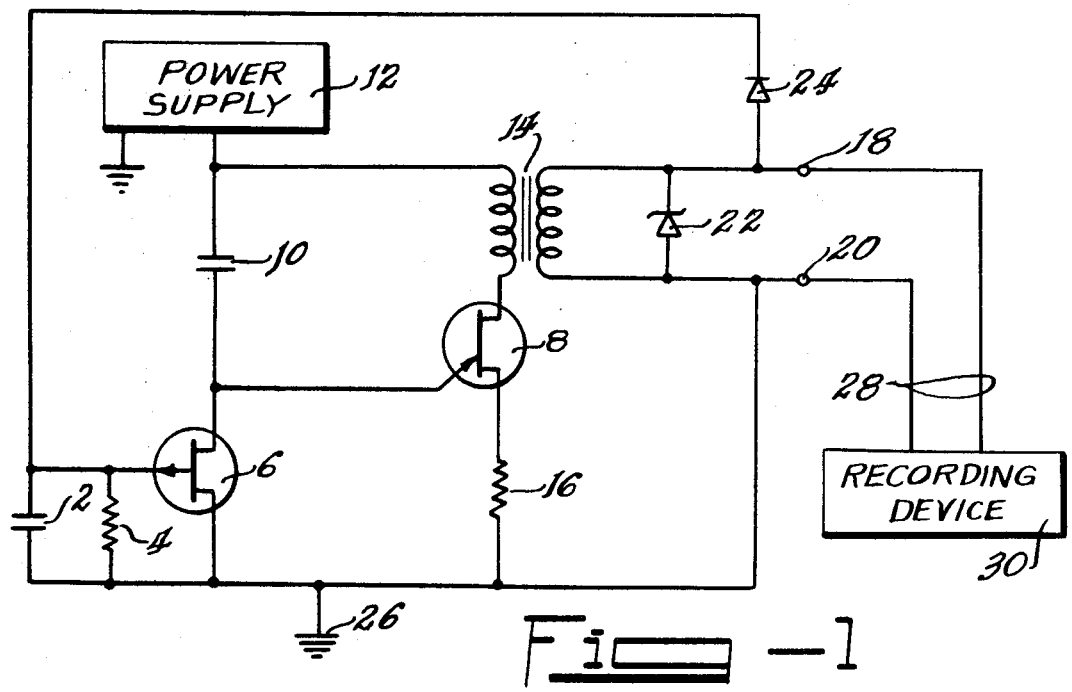
FIG. 1 is a circuit diagram illustrating a preferred embodiment of the invention for use in a high radiation zone.

Referring now to FIG. 1, a capacitor 2, such as a capacitance probe described hereinbefore and whose capacitance $C_2$ is to be measured, is connected in parallel with a resistor 4 having resistance $R_4$ and across the gate and source terminals of a field effect transistor 6. The drain terminal of field effect transistor 6 is connected to the emitter terminal of a unijunction transistor 8 and one side of a capacitor 10 having a capacitance $C_{10}$. The other side of capacitor 10 is connected to the output $V_c$ of a power supply 12 and, via the primary winding of a pulse transformer 14, to a first base terminal of the unijunction transistor 8. A second base terminal of unijunction transistor 8 is connected, via a resistor 16, to the source terminal of the field effect transistor 6.

A terminal 18 is connected to the cathode of a Zener diode 22, one side of the secondary winding of transformer 14, and the anode of a diode 24 which has its cathode connected to the gate terminal of field effect transistor 6. A terminal 20 is connected to the anode of Zener diode 22, the other side of the secondary winding of transformer 14, a ground reference potential 26, and the common connection between capacitor 2, resistor 4, field effect transistor 6, and resistor 16. Terminals 18 and 20 are also connected, via a transmission line 28, to a remotely placed recording device 30 such as a digital acquisition system or a pulse rate measuring device. Diode 22 is chosen such that the Zener voltage thereof is greater than the pinch-off voltage $V_p$ of the field effect transistor 6.

In operation, and assuming that a capacitor 2 is in a charged condition, resistor 4 will discharge capacitor 2 until the gate terminal voltage of field effect transistor 6 reaches the field effect transistor pinch-off voltage $V_p$, at which time field effect transistor 6 turns on. When field effect transistor 6 turns on, capacitor 10 is rapidly charged by power supply 12 until the emitter of unijunction transistor 8 reaches the emitter peak point voltage, at which time the unijunction transistor turns on. When unijunction transistor 8 turns on, capacitor 10 is discharged through the primary winding of transformer 14, thereby inducing across the secondary winding an output pulse which is transmitted, via transmission line 28, to the recording device 30.

The positive excursion of the output pulse across the secondary winding of transformer 14 charges capacitor 2, via diode 24, to the Zener voltage $V_z$ of the Zener diode 22, thereby turning off field effect transistor 6 and thus preventing capacitor 10 from recharging. Capacitor 2 discharges through resistor 4 commencing the discharge-charge cycle again.

Capacitor 2 is thus alternately charged to the Zener voltage $V_z$ and discharged to the field effect transistor pinch-off voltage $V_p$ thereby producing on line 28 a train of pulses which is measured by recording device 30. Since field effect transistors and unijunction transistors are highly radiation resistant, the device illustrated in FIG. 1 allows operation thereof in a radioactive zone.

As shown below, the capacitance $C_2$ of capacitor 2 is proportional to the time interval between successive output pulses, and, hence, inversely proportional to the pulse rate of the output pulse train.

The time, $T_{total}$, between successive output pulses on line 18 is equal to the sum of the time, $T_s$, required to discharge capacitor 2, and the time, $T_r$, required to recharge the capacitor 2, or, $$T_{total} = T_s + T_r \qquad (1)$$

The discharge time, $T_s$, is related to the unknown capacitance $C_2$ as follows $$T_s = {}_2R_4 \ln(V_z/V_p) \qquad (2)$$

wherein $R_4$, $V_z$ and $V_p$ are as defined hereinbefore.

The relationship between the time $T_r$ and the unknown capacitance, $C_2$, may be formulated as $$[T_r - C_2 R_4(1 - \mathrm{Exp}\ (-2T_r/C_2 R_4))] = \frac{(\eta V_c + V_d) C_{10}}{K g_{fs} V_p} \qquad (3)$$

wherein $g_{fs}$ = field effect transistor common source transconductance
$\eta$ = unijunction transistor intrinsic standoff ratio
$V_d$ = unijunction transistor forward conductance voltage drop
$K$ = constant of proportionality
$V_c$, $V_p$, $C_2$, $R_4$ and $C_{10}$ are as defined hereinbefore.

Since it is evident from equation (3) that $C_2$ is not linearly related to $T_r$, the time $T_r$ is made to be small with respect to the time $T_s$. This is accomplished by choosing a field effect transistor 6 with high common source transconductance $g_{fs}$ and by selecting a capacitor 10 with a suitable low value $C_{10}$.

Figure 2:
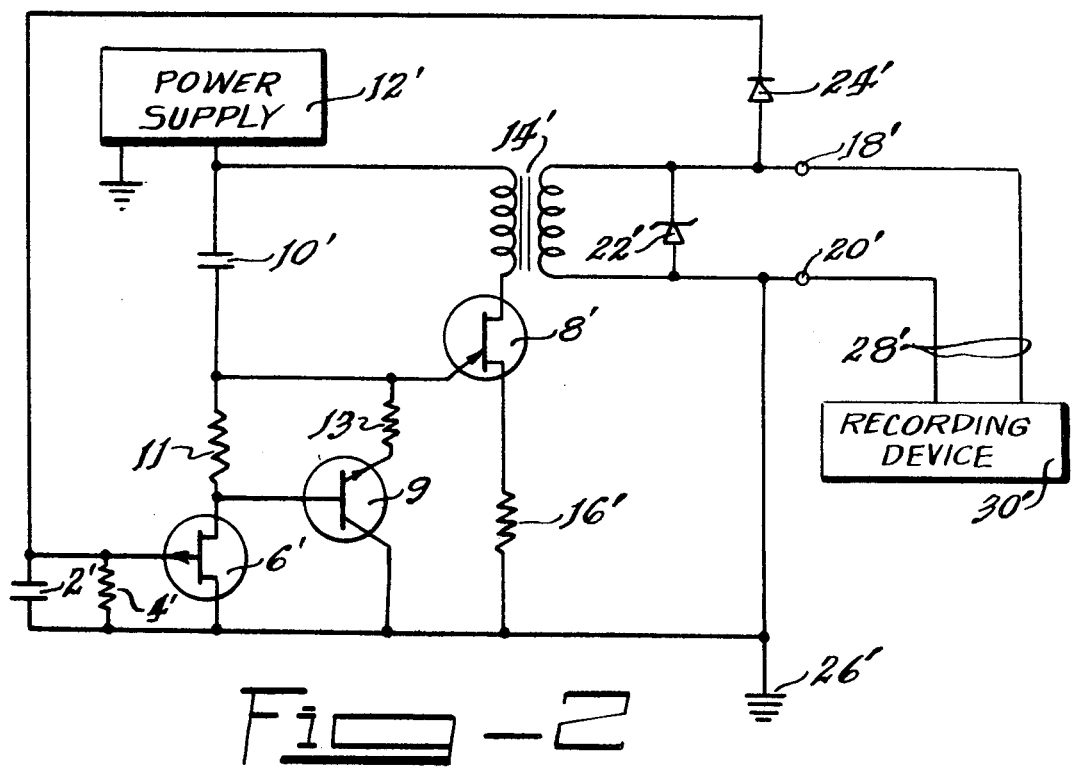
FIG. 2 is a circuit diagram illustrating a preferred embodiment of the invention for use in a low radiation zone.

If the capacitor 2 is located in a low or neutral radiation zone, thus allowing the use of conventional transistors, the time $T_r$ is further reduced by the insertion of a transistor in the charging circuit of capacitor 10. Such an arrangement is illustrated in FIG. 2, where a transistor 9 has its collector connected to the common ground reference potential 26' its base connected to the drain terminal of field effect transistor 6'. Resistor 11 is connected from the base of transistor 9 to the common connection of unijunction transistor 8' and capacitor 10'. Resistor 13 is connected from the emitter of transistor 9 to the common connection of unijunction transistor 8' and capacitor 10'. Capacitor 10' is now charged through the low collector-to-emitter resistance of transistor 9 rather than the relatively high source to drain resistance of the field effect transistor 6' thus effectively reducing the time $T_r$.

It is evident from equation (2) that the present device is equally well suited for measuring the unknown resistance of a resistor. Thus, if the capacitance of capacitor 2 is known, the unknown resistance of resistor 4 is obtained by recording device 30 from the pulse rate of the output pulse train on line 28. In one such application of the present device, the resistor 4 is replaced by a photoresistive cell. The pulse rate of the train of output pulses on line 28 is then proportional to the amount of illumination on the photocell. In another application of the present device the resistor 4 is replaced by a thermal sensitive resistor to yield a temperature-to-pulse rate conversion.

Persons skilled in the art will, of course, readily adapt the general teachings of the invention to embodiments other than the specific embodiments illustrated. Accordingly, the scope of the protection afforded the invention should not be limited to the particular embodiment shown in the drawing and described above, but shall be determined only in accordance with the appended claims.

The embodiments of the invention in which an exclusive property or privilege I claim are defined as follows:

1. In a device having a capacitive element and a resistive element electrically connected in parallel with one of said resistive and capacitive elements being known and the other of said resistive and capacitive elements being unknown, a circuit for measuring said unknown one of said elements comprising:

pulse generator means including an output and an input;
  a Zener diode connected across said output of said pulse generating means for limiting the pulse output thereof to a first predetermined voltage level;
  a second diode connected between said output of said pulse generating means and said parallel connected resistive and capacitive elements for charging said capacitive element to said first predetermined voltage level in response to an output pulse of said pulse generator means;
  a field effect transistor including gate and source terminals connected across said parallel connected resistive and capacitive elements and a drain terminal connected to the input of said pulse generator means for exciting said pulse generator means when said capacitive element has been discharged through said resistive element to a second predetermined voltage; and
  means for measuring the period of the output pulses of said pulse generator means.